United States Patent
Friederichs et al.

(10) Patent No.: US 9,296,860 B2
(45) Date of Patent: Mar. 29, 2016

(54) POLYMER, PROCESS AND COMPOSITION

(75) Inventors: Joseph Petronella Friederichs, Wessem (NL); Jacobus Adriaan Antonius Vermeulen, Born (NL); Marco Marcus Matheus Driessen, Maasbracht (NL)

(73) Assignee: DSM ASSETS B.V., Heerlen (NL)

( * ) Notice: Subject to any disclaimer, the term of this patent is extended or adjusted under 35 U.S.C. 154(b) by 934 days.

(21) Appl. No.: 13/517,333

(22) PCT Filed: Dec. 21, 2010

(86) PCT No.: PCT/EP2010/070362
§ 371 (c)(1),
(2), (4) Date: Oct. 19, 2012

(87) PCT Pub. No.: WO2011/076785
PCT Pub. Date: Jun. 30, 2011

(65) Prior Publication Data
US 2013/0211003 A1   Aug. 15, 2013

(30) Foreign Application Priority Data
Dec. 21, 2009   (EP) .................................... 09180162

(51) Int. Cl.
C08G 69/26   (2006.01)
C08G 81/00   (2006.01)
C08G 83/00   (2006.01)

(52) U.S. Cl.
CPC ................ C08G 69/26 (2013.01); C08G 81/00 (2013.01); C08G 83/005 (2013.01)

(58) Field of Classification Search
CPC ...... C08G 81/00; C08G 83/00; C08G 83/005; C08G 69/26; C08G 69/44

USPC ......................................................... 524/606
See application file for complete search history.

(56) References Cited

U.S. PATENT DOCUMENTS 2,631,992 A * 3/1953 Speck ........................... 528/349
4,755,623 A * 7/1988 Dileone ........................ 564/160
(Continued)

FOREIGN PATENT DOCUMENTS

| WO | WO 97/06201 | 2/1997 |
| WO | WO 2006/115547 | 11/2006 |

OTHER PUBLICATIONS

International Search Report for PCT/EP2010/070362, mailed May 19, 2011.
(Continued)

*Primary Examiner* — Jane L Stanley
(74) *Attorney, Agent, or Firm* — Nixon & Vanderhye P.C.

(57) ABSTRACT

There is described a process for producing a gel free hyperbranched polyamide polymer having primary amino groups (useful as a crosslinker). The process comprises the step of reacting at least one diamine and at least one unsaturated diester in a molar ratio of diamine to diester greater than 1 but less than 3 (preferably 2.1 to 2.9); to form the polyamide in a two stage reaction Michael addition and then amidation. The diamine in kept in excess with at least 5% of water by total weight of the diamine and diester, a reaction temperature less than the boiling point of the diamine; and is held under reduced pressure (30 mbar to 1 atms). Gelation does not occur even after substantially all ethylenic (—C=C—) double bonds; and >95% ester [—C(O)=O] groups have reacted. This violates the Flory rules which predict a gel would form based on the number of functional groups present and their degree of conversion.

19 Claims, 2 Drawing Sheets

(56) References Cited

U.S. PATENT DOCUMENTS

| | | | |
|---|---|---|---|
| 5,665,855 A * | 9/1997 | Acevedo et al. | 528/353 |
| 5,686,556 A * | 11/1997 | Jouffret et al. | 528/310 |
| 2005/0171298 A1 | 8/2005 | Tomalia et al. | |
| 2006/0160988 A1 * | 7/2006 | Tomalia et al. | 528/310 |
| 2007/0191586 A1 * | 8/2007 | Stumbe et al. | 528/350 |

OTHER PUBLICATIONS

Written Opinion for PCT/EP2010/070362, mailed May 19, 2011.

* cited by examiner

POLYMER, PROCESS AND COMPOSITION

This application is the U.S. national phase of International Application No. PCT/EP2010/070362 filed 21 Dec. 2010 which designated the U.S. and claims priority to EP Patent Application No. 09180162.1 filed 21 Dec. 2009, the entire contents of each of which are hereby incorporated by reference.

The present invention relates to the field of polymers that comprise amino groups, such as polyamides comprising amino groups, especially hyperbranched polyamides.

Hyperbranched polymers such as polyester amides are known and can be prepared with many different groups optimized for many different uses. For example various functionalised hyperbranched polyester amides and methods for making them are described in WO 1999-016810 (hydroxy functional); WO 2000-056804 (carboxy functional); WO 2000-058388 (dialkyl amide functional); and WO 2003-037959 (ethoxy functional).

It has long been believed that any primary amine group present in a polyester amide would undergo intermolecular amidation with the ester groups. As a result hyperbranched polyester amide polymers with primary amine end groups have not been prepared. It has been found by the applicant that indeed a complete breakdown of the ester bonds occurs when these hyperbranched polyesteramides are treated with a diamino compound. For example the applicant has attempted to prepare a primary amine functional hyperbranched polymers from a polyester amide made from hexahydrophtalic acid anhydride and diisopropanol amine. This polymer has a molecular weight of 1200 g/mol and was reacted with 1,4-diaminobutane (DAB). Infrared, viscosity and GPC analysis confirmed that all esters were broken down and became amides. This shows that in the presence of esters, primary amine end groups cannot be achieved. There is a still need to provide (optionally hyperbranched) polymers that also comprise amino groups.

WO 97-06201 (DSM) describes highly branched polymers comprising many polyolefin arms. Some embodiments of this invention may be prepared by reacting amine functional intermediates (e.g. amine functional olefins) with esters to form polyamides (e.g. as part of the polymer backbone). Such polyamides do not contain primary amine groups and there is no suggestion this document of how to prepare a polymer that comprises primary amino groups (or even that it might be a desirable to do so.

US 2006-160988 US 2005-171298 and WO 2006-115547 (all Tomalia) each describe the preparation of various dendrimers that may comprise residual primary amino groups. Some of these dendrimers may be prepared by reacting esters with amines. The Tomalia references describe various methods for making dendrimeric monodisperse macromolecules using multistage processes that gradually build up a very large molecule from a small core. Some of the reagents used in these processes (such as methyl(meth)acrylate) are undesirable as raw materials due to their toxicity. These documents describe dendrimers and not polymers and the many important differences between polymers and dendrimers are explained more fully below.

Dendrimers (often confusingly referred by Tomalia as dendritic polymers) are very different from conventional polymers even highly branched polymers such as hyperbranched polymers. Polymers are polydisperse materials comprising mixtures of many different macromolecules having different numbers of repeat units. Dendrimers are globular, monodisperse macromolecules, typically forming large spheres. Dendrimers have the disadvantage that they are prepared by laborious multi step self condensation processes where the same functionalities react in multiple generation steps. Exact control of the process conditions may be needed to prevent side reactions and the resultant dendrimer is a very bulky single macromolecule. In contrast polymers are easy to prepare with a variety of different molecular weights (from small oligomers to much larger polymers) can be produced having many other properties tailored to their end use, and can be made in a few steps often a single step.

Non dendrimer macromolecules (such as the polymers of the present invention) may be obtained from a one pot reaction performed once. As the product from the previous step can react again in the next step it is possible to repeat steps a few more times to produce larger macromolecules. If steps are repeated, it is possible to use different reagents independently in each repeated step (unlike dendrimers prepared by multi-generation self condensations). Non-dendrimer macromolecules may generally be cheaper to produce than dendrimers of similar functionality.

A skilled person would not refer to a method for making dendrimers (such as the Tomalia processes) if they were interested in making polymers. Features used to make dendrimers would not be considered useful for or interchangeable with conventional polymerisation methods. For similar reasons a skilled person would know due to their very different physical structure dendrimers would have very different properties to polymers even if made from similar repeat units.

WO 2002-26887 (Michigan Biotech Institute) describes a crosslinked polyamide prepared by reacting a crosslinking agent with a polyamide synthesised from an amine, polyamine and unsaturated lactone. The resultant polymers are not amine functional.

EP 1300434, US 2003-06937 and U.S. Pat. No. 6,646,089 (all Michigan Molecular Institute) each describe hyperbranched polymers having a two types of functional groups. These polymers are prepared from monomers $A_x$ and $B_y$, where A and B represent functional groups which do not react with themselves but only with each other. Although a large variety of monomers with many different functional groups are suggested, the specific monomers exemplified are polyureas and/or comprise silane functional groups. None of these documents appreciate the difficulty of obtaining hyperbranched polymers with primary amino groups or suggest how this might be achieved in practise.

In many patent applications (of which U.S. Pat. No. 5,126,170 is a representative example) Bayer describe secondary polyamines of the polyaspartate type comprising multiple ester groups. Though these polyaspartates are prepared in part by reacting diamines and diesters the process is very different from that of the present invention. The polyaspartates have a very different structure to the polymers of the present invention for example the polyaspartates do not comprise primary amino groups.

Surprisingly the applicant has discovered a simple method that can produce polyamides that comprise primary amino groups and avoids gelling. As used herein polyamide means polydisperse mixtures of macromolecules that comprise amide linkages and which are not dendrimers. Preferred polyamides are hyperbranched.

In theory a hyperbranched polyamide that also comprises primary amine groups might be prepared by successive reactions between a multi functional primary amine and an unsaturated diester and their reaction products. Primary amine groups can react with the ester groups to form an amide and can also undergo Michael addition across the electron deficient ethylenic double bond. However the reaction products are themselves amine functional (which is needed to build up a polymer) and contain —OC=O— groups. It has been thought that primary amines react preferentially with these ester groups by undergoing intermolecular amidation which would lead to gelling. In general these side reactions do occur and so this route has not be used to produce equivalents of the hyperbranched polyester amides discussed above that also comprise primary amino groups.

The applicant has surprisingly discovered that certain diamines and diesters when reacted together in a certain molar ratio do not form a gel (which would indicate intermolecular amidation) but instead produce polymers that comprise primary amino groups. This is contrary to what would be expected and what is predicted by the well known general rules for polycondensation reactions devised by to Paul Flory (Flory PJ (1953) Principles in polymer chemistry. Cornell University Press). The Flory rules are explained further below.

If polyfunctional monomers (f>2) are present in a polycondensation, branched structures can be formed and Flory developed rules that are widely used to indicate when such systems would produce infinite networks, also called gels. First the critical branching degree at which gel forms is calculated using the formula $\alpha_c=1/(f-1)$ where f is the functionality of the polyfunctional monomer. Next the percentage degree of conversion of monomer into polymer is determined at point where the critical branching degree is reached. The ratio of the functional groups of the polyfunctional monomer to the functional groups of the bifunctional monomer is calculated (as a ratio=r). The value r is combined with the critical branching degree in the formula $P_A=\sqrt{(\alpha_c/r)}$ where $P_A$ is the degree of conversion of the polyfunctional monomer required for the product to turn into a gel. Thus once the calculated value of $P_A$ is reached during polycondensation Flory predicts the polymer will gel.

The polymers prepared by certain reactions (such as a combined Michael addition polycondensation) are prepared from polyfunctional monomers with more than two functional groups (such as unsaturated diesters with a functionality of three—two esters and one ethylenic double bond) and bifunctional monomers (such as diamines). Before attempting to prepare such polymers a skilled person would routinely apply the Flory rules to calculate whether such a reaction would be expected to gel. Where Flory would predict gellation the skilled person would then adjust the ratio of reagents to avoid a gel, select alternative reagents having fewer functional groups that Flory predicts do not gel or (where possible) would stop the reaction before the conversion point is reached that Flory predicts a gel will form.

The reaction between diamine (e.g. 1,4-diaminobutane—DAB) and the diethyl ester (e.g. diethyl fumarate—DEF) can be used as an non limiting illustration of the invention. DEF is trifunctional so has a critical value of 0.5. That means, according to Flory, that if the critical branching degree is less than 0.5, there is less than an even chance that each chain will lead to a branch unit and thus to two more chains. When the critical branching degree is more than 0.5, there is more than an even change for this to happen and therefore Flory predicts gel formation is possible.

So for example if DAB and DEF react in a stoichiometric ratio 9/4, then 18 amine groups react with a total of 12 functional groups on the 4 moles of DEF (4 double bonds for a Michael addition and eight esters for amidation). The ratio between the functional groups of these trifunctional and the bifunctional monomers therefore is 12/18 or 2/3.

With the critical branching degree and the mole ratio between the functional groups, a skilled person would readily use the Flory rules to calculate the degree of conversion of DEF at which they would expect gelation to occur. $P_A=\sqrt{(\alpha_c/r)}=\sqrt{(0.5/(2/3))}=0.866$, i.e. Flory predicts that when DAB and DEF react in the respective ratio 9/4, a gel will form when 86.6% of the DEF double bonds and esters have been converted (reacted). Similar Flory calculations predict that gels will form for polycondensation of DAB/DEF at ratios of 5 to 2 and 13 to 6 at respectively 91.3% and 85% conversion of DEF.

Thus a skilled person following the Flory rules would not allow polycondensation between DAB and DEF to proceed to completion at certain ratios of DAB to DEF. But as the reaction between diamines and diester is rapid and cannot be easily controlled, it would be difficult to stop DEF conversion to below these Flory thresholds. Therefore a skilled person would assume gellation could not be prevented and would be deterred from preparing polymers from polycondensation of DAB and DEF as it would be believed that no useful product could be obtained.

Instead the applicant has found very unexpectedly that (non dendrimer) optionally hyperbranched polyamides that comprise primary amino groups can be successfully prepared from polycondensation of certain diamines with certain diesters with surprising ease and much higher conversion rates of the diester (up to 100% or complete conversion) to form non gelled polymers. This is, contrary to the Flory rules that predict gelation would occur. Applying the Flory rules indicates (wrongly) that the reaction of the present invention would form a gel.

Broadly in accordance with one aspect of the present invention there is provided a process for the preparing a substantially gel free polymer (i.e. not a dendrimer) comprising primary amino groups, the process comprising the step of reacting Reagent A, a compound comprising at least two amino groups; and Reagent B, an unsaturated ester comprising a plurality of ester groups;

where the molar ratio (denoted by Rt) of Reagent A to Reagent B is more than one and less than three, preferably from 1.1 to 2.9. Other preferred values for Rt are described herein.

Broadly in accordance with one embodiment of the process of present invention there is provided a process for producing an (optionally hyperbranched) polyamide that comprises one or more primary amino groups (—NH$_2$), the process comprising the step of reacting Reagent A comprising at least one diamino$C_{1-12}$hydrocarbon (preferably a diamino$C_{1-10}$alkane); and Reagent B comprising at least one di($C_{1-12}$hydrocarboxy)$C_{3-10}$hydrocarbo-enedioate (preferably a di($C_{1-6}$alkoxy) $C_{4-6}$alkenedioate) ester) and/or anhydride thereof;

where Rt is in the range from 1.1 to 2.9 (or as given elsewhere); and where the reaction is carried out in the presence of sufficient water to prevent gelation. to form as a product a (non dendrimer) polyamide comprising one or more primary amino groups.

In another important feature of the invention the process is performed in the presence of water in sufficient amounts to avoid gelation. It will be appreciated that the exact amount of water needed will depend on the specific Reagents A and B that are used and their ratio Rt and can be determined for any combination of Reagents without undue experimentation. Without wishing to be bound by any mechanism it is believed that water may hydrolyse some of the intermediate products of the reaction and perhaps lower the actual amount of functional groups present to avoid gelation.

Therefore preferably the process of the invention is performed in the presence of water in an amount by weight (based of the total amount of Reagents A and B) of at least 5.1% and less than 23.3%, more preferably from 5.5% to 22% by weight, most preferably from 6% to 20%, usefully 7% to 15%, more usefully from 8% to 12%, for example about 10% by weight.

Moles of Reagents A or B (and thus Rt) are calculated based on the moles of the whole reagent needed to provide a given amount of reacting groups. A reacting group of Reagents A or B is a group which under the conditions of the reaction is capable of undergoing a corresponding reaction with a group comprising the other of Reagents A or B (or intermediate products formed therefrom). So for example when Reagents A is a diamine and Reagent B is a monounsaturated diester then for Reagent A the reacting groups are the two amino groups and there are two moles of reacting group (amino) per mole of Reagent A. For Reagent B the reacting groups are the single ethylenically unsaturation and the two ester groups so there would be three moles of reacting group per mole of Reagent B.

Preferably the reaction step is carried out at a temperature of greater than 0° C. and less than the boiling point of Reagent A, more preferably from 20° C. to the boiling point of Reagent A, and most preferably from ambient temperature to the boiling point of Reagent A. Further temperature preferences are described herein.

Optionally the reaction is carried out (at least in part) under reduced pressure, preferably less than one atmosphere. Further pressure preferences are described herein.

The process of the invention provides a method for obtaining polyamides (not dendrimers) with primary amino groups which are substantially free of gel (infinite polymer network).

Preferably the process of the invention is performed until the reaction mixture and/or product is substantially free, more preferably 100% free of ethylenic —C=C— double bonds.

Preferably the process of the invention is performed until the reaction mixture and/or product comprises no more than 5% equivalents of the initial amount in the diester of ester [—C(O)=O] double bonds, more preferably is substantially free, most preferably 100% free of ester [—C(O)=O] double bonds.

Preferably at the end of the process at least 95%, more preferably at least 98%, most preferably at least 99%, for example 100% of the ethylenic (—C=C—) double bond in the initial diester are no longer measurable in the reaction mixture and/or product (this is also denoted herein as degree of conversion).

Preferably at the end of the process at least 95%, more preferably at least 98%, most preferably at least 99%, for example 100% of the ester [—C(O)=O] double bonds in the initial diesters are no longer measurable in the reaction mixture and/or product (this is also denoted herein as degree of conversion).

The relative amount of ester and/or ethylenically unsaturated double bonds present in the reaction mixture and/or product may be measured by any suitable technique for example by proton NMR and FTIR.

Broadly in another embodiment of the polymers of invention there is provided a substantially gel free (non dendrimer) polyamide comprising primary amino groups, the polyamide comprising repeat units derived from Reagent A and a Reagent B (as described herein) where the relative molar ratios of said repeat units is given by Rt (also as described herein).

The polyamide of the invention may be obtained and/or obtainable by a process of the invention as described herein In another aspect of one embodiment of the invention there is provided a substantially gel free polyamide having primary amino groups therein where the polyamide comprising repeat units derived from unsaturated diester (preferably a trifunctional mono unsaturated diester) and repeat units derived from a diamine (and/or amino acid comprising at least two amino groups) where the percentage of ester groups remaining in the polyamide is denoted by $P_e$ and satisfies the relationship $$P_e < \sqrt{(\alpha_c/r)}$$

where $\alpha_c = 1/(f-1)$ where f is the functionality of the ester derived repeat unit (which for a mono unsaturated diester is 3) and r is the ratio of the functional groups of the ester derived repeat unit to the functional groups of the diamine (or diamino amino acid).

Thus polymers of the invention violate the Flory rules. $P_e$ may be measured using proton NMR relative to the amount of diester used to prepare the polyamide.

The process of the invention uses an excess of diamine with respect to the diester and it is preferred to add the diester to the diamine so the diamine is always in excess.

It is preferred that the final product is substantially (more preferably completely) free of ester [—OC=O—] functional groups. This is desired so the amine groups can co-exist on the polymer without intermolecular amidation which might lead to gelling.

The water may be present in an amount of at least about 5%, preferably from 5.1% to 25%, more preferably from 6% to 15%, most preferably from 7% to 10%) by weight of the total amount of Reagents A and B in the process of the present invention.

Preferred polyamides of the invention may comprise three dimensional structures such as hyperbranched (but not dendrimers) but other more linear structures such as graft polymers may also be prepared by the process of the present invention.

Preferred polyamides of the invention have a hyperbranched structure, primary amine functional groups and are highly reactive towards certain groups such as isocyanate. Prior art highly branched macromolecules (such as the hyperbranched polyester amides available commercially from DSM under the trade mark Hybrane® and the ester functional macromolecular material available commercially from Perstorp under the trade mark Boltorn®) contain ester groups and so undergo complete internal reactions between the ester and primary amine groups so that no primary amine groups remain on the final polymer.

The process of the present invention uses cheap starting materials which react quickly together and provides a new polycondensation route to obtain hyperbranched polyamides with primary amine groups.

Rt represents the diamine to diester mole ratio, so >1 means excess diamine. Rt may be from 1.1 to less than or equal to 2.9. Preferably $2.0 \le Rt \le 2.8$. More preferably $2.1 \le Rt \le 2.7$. Most preferably $2.15 \le Rt \le 2.67$. For example Rt is from 2.2 to 2.6. In particular Rt is 2.5.

Conveniently Rt satisfies the relationship "Rt=(2n+1)/(n)" where 2n+1 is moles of diamine and n is moles of diester. The upper limit of n is not too high (upper limit of n is preferably 20, more preferably 15, most preferably 10) as when $n \to \infty$ then $2n+1 \to 2n$ and the applicant has discovered that reacting diamine with diester in a molar ratio of 'n' diamine to '2n' diester will produce a gel. More conveniently n is an integer selected from the inclusive range from 2 to 10, most conveniently from 2 to 8, in particular from 2 to 6. Most conveniently Rt is selected from one of the following mole ratios (diamine to diester): "5 to 2"; "7 to 3", "9 to 4"; "11 to 5" or "13 to 6".

Rt is preferably a measure of the initial molar ratio of a diamine to a diester. If the ratio changes during the reaction it is preferred that this molar ratio Rt may be maintained by addition of further reagent. For example the reaction mixture may be heated to remove (by distillation) ethanol produced during the polycondensation (and help drive the equilibrium to the right) and/or the pressure of the reaction mixture can be reduced to remove ethanol. However heating or reducing pressure may also remove some diamine (especially if the diamine has a low boiling point). Further diamine may be added to the reaction mixture to keep the value of Rt within the desired range specified herein. If necessary this adjustment can be done automatically with the appropriate sensors and dosage equipment. It is preferred that the process of the present invention is carried out at a temperature less than the boiling point of the diamine (or mixture of diamines) used so that the molar ratio (Rt) is not significantly altered and no further diamine need be added.

For comparison one preferred diamine for use in the present invention is diamine butane (DAB) which has a boiling point of 158-160° C.

The mole ratio (Rt) herein is calculated based on the initial number of moles of the whole molecule (i.e. diamine or diester) and not the individual functional groups thereon.

The number of moles of diester is calculated as the number of moles of diester that would provide the equivalent of the three reactive functional groups thereon (two [—ROC═O)—]ester and one ethylenic bond). These are the 3 groups that are capable of reacting with the primary amino (—NH$_2$) groups on the diamine.

The number of moles of diamine is calculated herein as the number of moles of diamine that would provide the equivalents of the two amino groups thereon, i.e. is based on moles of diamine molecule and not its constituent amino groups. The moles of the amino groups for a di-amine would of course be double the moles of the diamine and thus a ratio of amino groups to diester (as used in some prior art documents) would need to be halved to be converted into the equivalent value for the ratio Rt (diamine to diester) used herein.

So in both cases it is moles of the whole molecule not the reactive groups thereon that is used to calculate ratio Rt.

Advantageously the process of the invention may be performed at a temperature of 150° C. or less, usefully 120° C. or less, preferably 100° C. or less, more preferably ≤80° C., more preferably ≤60° C., most preferably ≤50° C. and in particular at room (ambient) temperature. Higher temperatures are not preferred as it is believed that intermolecular amidation may then occur.

Usefully the process of the invention may be performed at a reduced pressure (less than one atmosphere) to remove alcohol produced, for example at a pressure of less than 0.1 Bar, more preferably less than 50 mBar, for example about 30 mBar. It is preferred to start reducing the pressure of the reaction only after ester bonds can no longer be detected (e.g. by proton MNR or FTIR) in the reaction mixture.

The applicant has found that amine functional polyamides of the invention are useful as cross linkers for isocyanate functional polymers as they react virtually instantaneously with NCO groups.

Thus the applicant has discovered it is possible to synthesize primary amine functional hyperbranched polyamide using the above process. All analyses indicate that the desired amino functional structure is formed.

Typically the reaction speed of the Michael addition is very fast resulting in 100% conversion of the unsaturation of the diester (such as DEF).

The second reaction, the amidation, is also fast and occurs readily at room temperature. However it is preferred to perform the process (step (a) slightly higher than room temperature and under reduced pressure more easily to remove the solvent, water, and the ethanol formed during the reaction. The boiling point of the preferred diamines is not very high (e.g. DAB has a boiling point of 158-160° C.) and so for this reason so conveniently the reaction temperature is not too high and the reduced pressure not too low so that significant amounts of diamine (such as DAB) are removed as this would change the molar ratio (Rt) with the diester which might result in gelation. Alternatively if the process conditions are such that diamine is removed, sufficient diamine (such as DAB) can be added during the reaction to maintain the molar ratio Rt within the ranges specified herein. Optionally diamine concentration in the reaction mixture can be monitored continuously to facilitate this.

A further aspect of an embodiment of the polymers the present invention provides an amino functional polyamide obtained and/or obtainable by the process of the present invention.

A still further embodiment of the polymers of the present invention provides one or more amino functional polyamide molecules represented by Formula 1;

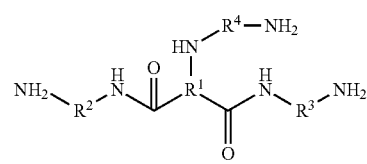

Formula 1 in which
R$^1$ is independently in each case a C$_{2-6}$hydrocarbylyne [preferably C$_{2-6}$alkylyne, more preferably ethylyne];
R$^2$, R$^3$ and R$^4$ independently in each case and of each other represent a moiety selected from the group consisting of: C$_{2-6}$hydrocarbylene [preferably C$_{2-6}$alkylene, more preferably ethylene]; and
a divalent or trivalent linking moiety of Formula 2:

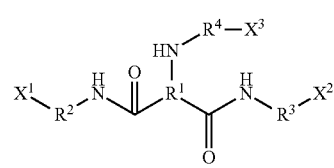

Formula 2 in which
R$^1$, R$^2$, R$^3$ and R$^4$ are independently in each case and of each other are defined as above; and
X$^1$, X$^2$ and X$^3$ independently in each case and of each other represent:
(i) an amino group (—NH$_2$);
(ii) a direct single bond from the atom to which they are attached to the molecule of Formula 1 or to a further moiety of Formula 2; and/or
(iii) a divalent imino (—NH—) group attached to a molecule of Formula 1 or a further moiety of Formula 2;

where at least two of $X^1$, $X^2$ and $X^3$ represent a bond [option (i)] or imino [option (ii)]; with the proviso that where any of $X^1$, $X^2$ or $X^3$ denote the imino group [option (ii)] in that case they are not directly attached to another nitrogen atom in Formula 1 or 2.

It can be seen that successive polycondensation reactions between intermediate products can result in large molecules comprising many moieties of Formula 2.

Conveniently each instance of $R^1$ is the same in each molecule of Formula 1 and/or moiety of Formula 2.

Conveniently each instance of $R^2$ is the same in each molecule of Formula 1 and/or moiety of Formula 2.

Conveniently each instance of $R^3$ is the same in each molecule of Formula 1 and/or moiety of Formula 2.

Conveniently each instance of $R^4$ is the same in each molecule of Formula 1 and/or moiety of Formula 2.

Conveniently $R^2$, $R^3$ and $R^4$ are the same in each molecule of Formula 1 and/or moiety of Formula 2.

A still yet further embodiment of the polymers of the present invention provides one or more amino functional polyamide molecules represented by Formula 3;

$(R^5)_p(A^2)_nA^1$      Formula 3 where:
n is 1, 2, or 3 and n+p=3 (so p is 0, 1 or 2);
$A^1$ is independently in each case a $C_{4-8}$hydrocarbylynedicarbonyl; [preferably $C_{4-6}$alkylynedicarbonyl, more preferably ethylynedicarbonyl];
$R^5$ independently in each case and of each other is attached to $A^1$ and is H or an alkoxy group (such as $C_{1-8}$alkoxy);
$A^2$ independently in each case and of each other is attached to $A^1$ and is a moiety of

$Z^1NHR^6NHZ^2$      Formula 4 where $Z^1$ and $Z^2$ independently in each case and of each other are H, or a direct bond to a further moiety of Formulae 3 or 4; and
$R^6$ represents:
(A) $C_{2-6}$hydrocarbylene [preferably $C_{2-6}$alkylene, more preferably ethylene]; and/or
(B) $C_{4-8}$hydrocarbylynedicarbonyl; [preferably $C_{4-6}$alkylynedicarbonyl], more preferably ethylynedicarbonyl
where (A) and/or (B) may be optionally substituted by a further moiety of Formula 4.

Formula 3 may comprise ester functional groups (e.g. when it comprises alkoxy groups) and so generally represents intermediates that are formed during successive polycondensations that occur in the process of the invention. It is preferred that the final product is substantially free of carbonyl ester groups (to reduce the possibility of intermolecular amidation and therefore improve stability against gelling) and so the final product is better represented by Formula 1 which is free of alkoxy groups. It will be appreciated that there is some unavoidably overlap between the structures of the (mostly) intermediates of Formula 3 and the (mostly) final products of Formula 1. And a final product may comprise some mixture of molecules of Formulae 1 and 3.

Molecules of Formula 1 and/or Formula 3 may represent the part or the whole of a polymer i.e. these molecules may comprise a portion or whole of a polydisperse mixture that comprise different molecules. Thus some or all of the components of a polydisperse polymer of the invention may be represented by Formula 1 and/or Formula 3.

The present invention comprises both these molecules and polymeric mixtures of which they comprise a part. Preferred polydisperse polymers of the present invention may comprise those in which molecules of Formula 1 and/or 3 comprise at least 1%, more preferably ≥2%, most preferably ≥5% (and in particular ≥10%) by weight of the polydisperse polymer. Conveniently polydisperse polymers of the present invention comprise those in which molecules of Formula 1 and/or 3 comprise up to 90%, more preferably ≤92%, most preferably ≤95%, (and in particular approximately 100%) by weight of the polydisperse polymer.

Preferred polymers of the invention comprise one or more molecules selected from the group consisting of Group A, B or C below. It is particularly preferred that molecules of the invention are highly branched macromolecules such as hyperbranched polymers.

The weight average molecular mass ($M_w$) of polymers of the invention is generally from 800 to 50,000, preferably from 1000 to 25,000, more preferably from 2000 to 20,000, most preferably from 5000 to 15,000 daltons.

The number average molecular mass ($M_n$) of polymers of the invention is generally from 500 to 15,000, preferably from 700 to 10,000, more preferably from 800 to 6,000, most preferably from 1,000 to 4,000 daltons The primary amine functionality of the polyamides of the invention is generally from 2 to 250 and preferably from 3 to 100, more preferably from 4 to 50, for example from 6 to 30.

The amide functionality of the polyamides of the invention is generally 2 to 250 and preferably from 3 to 100, more preferably from 4 to 50, for example from 6 to 30.

Functionality above is the average number of groups of the specific type per molecule in the polymer composition.

The degree of branching and the functionality of the polymer are dependent on the starting materials and the molecular weight of the polymer. A molecular weight higher than 2000 generally leads to highly branched structures with a functionality of >10.

The process of the invention is now more fully explained below where the diester may be denoted by $B_3$ (to indicate there are 3 amine-reactive groups thereon (i.e. that are capable under the conditions of the process of the invention of reacting with primary amine functional groups), namely the 2 ester groups and $1C=C$ bond) and the diamine may be denoted by $A_2$ (to indicate there are 2 primary amine groups thereon).

Diesters ($\equiv B_3$)

Usefully diester (i) may be a di($C_{1-4}$alkoxy)$C_{4-6}$alkenedioate.

Diester (i) is trifunctional with respect to primary amine groups, having 2× alkoxy groups attached to a carbonyl which can undergo trans-amidation; and 1× alkylene group which can undergo Michael addition.

Useful diesters may be compounds of Formula 5:

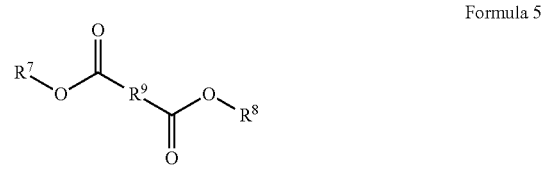

Formula 5 where
$R^7$ and $R^8$ are independently $C_{1-4}$alkyl; and
$R^9$ is a divalent $C_{2-4}$hydrocarbo group comprising at least one $C=C$ double bond.

Particularly preferred compounds of Formula 5 may be represented by the structure

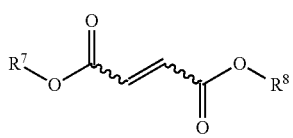

where $R^7$ and $R^9$ are $C_{1-4}$ alkyl, preferably methyl or ethyl, more preferably ethyl.

Optionally $R^7$ is the same as $R^9$ and the compound may be the E or Z isomer.

Suitable optionally substituted maleic or fumaric acid esters for use in the present invention may be represented by the formula

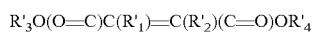

wherein
$R'_1$ and $R'_2$ may be identical or different and represent hydrogen or organic groups (both are preferably hydrogen),
$R'_3$ and $R'_4$ may be identical or different and represent organic groups (preferably $C_1$-$C_8$ hydrocarbo and most preferably methyl or ethyl), Examples include the dimethyl, diethyl and di-n-butyl and mixed alkyl esters of maleic acid and fumaric acid and the corresponding maleic or fumaric acid esters substituted by methyl in the 2- and/or 3-position. Suitable maleates or fumarates for use in the present invention include dimethyl, diethyl, di-n-propyl, di-isopropyl, di-n-butyl and di-2-ethylhexyl maleates, methylethylmaleate or the corresponding fumarates.

Thus for example particular useful diesters are:

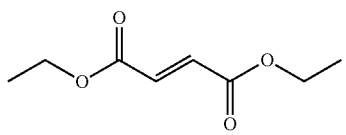

diethyl fumarate (DEF) ≡trans-1,2-ethylenedicarboxylic acid diethyl ester E diethyl 2-but-E-enedioate;

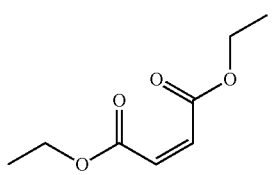

diethyl maleate (DEM) ≡cis-1,2-ethylenedicarboxylic acid diethyl ester ≡diethyl 2-but-E-enedioate; and/or
Mixtures thereof.

Another preferred compound of Formula 5 is

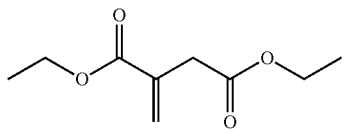

≡diethyl itaconate E dimethyl 2-methylenebutanedioate.

Dialkyl citraconate and/or dialkyl mesoconate are also preferred diesters,

Diamines (≡A$_2$)

In one embodiment of the invention the diamine may comprise cyclic and/or aromatic hydrocarbo groups however in another more preferred embodiment the diamine comprises alkyl and alkylene groups.

Usefully the diamine may be a diamino$C_{2-6}$alkane≡$C_{2-6}$ lkylene diamine, preferably the diamine is unsaturated and/or linear and/or both the amino groups are located on different terminal carbons at ends of the alkylene chain.

Preferred diamines are free of secondary amine groups (—NHR where R is hydrocarbo)

Other suitable polyamine reagents that may be used in the process of the present invention include ethylene diamine, 1,2- and 1,3-propane diamine,
2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4- and/or 2,4,4-trimethyl-1,6-hexane diamine, 1,7-heptane diamine, 1,8-octane diamine, 1,9nonane diamine, 1, 10-decane diamine, 1,11-undecane diamine, 1,12dodecane diamine, 1-amino-3-aminomethyl-3,5,5-trimethyl cyclohexane, 2,4- and/or 2, 6-hexahydrotoluoylene diamine, 2,4'- and/or 4,4'-diamino-dicyclohexylmethane, 3, 3-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, 4,4'-diaminodiphenyl methane More preferred diamines are selected from:
ethylene diamine ($C_2$)≡1,2diamino ethane;
putrescine ($C_4$)≡1,4-butane diamine≡tetraamethylene diamine≡1,4-diaminobutane ≡DAB≡

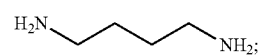

MPMD≡

≡1,5-2-methylpentanediamine≡2-methylpentamethylene-diamine, (such as that available commercially from Invista under the trade mark Dytek® A);

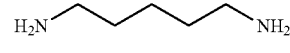

≡cadaverine ($C_5$)≡1,5-pentanediamine≡pentamethylene diamine;
lysine≡

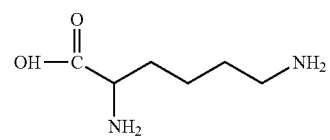

≡1,5-2-carboxypentanediamine ($C_5$)

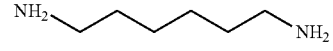

≡hexamethylene-diamine ($C_6$) (HMDA); mixtures thereof; salts thereof and/or different suitable forms thereof (such one or more of those forms described later herein, for example such as sterioisomers and entaniomers).

Lysine (also abbreviated as Lys or K) is an α-amino acid which is an essential amino acid (i.e. required for human health but not synthesised by the human body). As used herein unless the context indicates otherwise the term lysine includes esters and salts thereof including acid or basic salts. Preferred lysine salts are metal salts with a carboxylate group anion, more preferably alkali metal and alkali metal earth salts, most preferably the sodium salt. Usefully the lysine may be l-lysine which is the naturally occurring entaniomer readily available from natural sources. However other entaniomers or racemic mixtures could also be used in the present invention.

HDMA and lysine are the more preferred diamines, most preferably HDMA. MPMD and lysine have the advantage of a less pungent odour than other diamines described herein. DAB has an unpleasant odour which can detected by smell at a concentration of 25 ppb, although if DAB is used in the process of the invention complete conversion of the diamine can be readily confirmed as there is no smell in final product. Both putrescine and cadaverine are so called because they are largely responsible for smell of rotting flesh.

These diamines are normally supplied dissolved in water (e.g. 70% aq DAB). The applicant has found that surprisingly if the diamine is used neat (i.e. without the presence of water) then gelation may occur. Therefore it is a preferred embodiment of the invention that a minimum amount of water is present when reacting the diamine with the diester.

Reaction

Without wishing to be bound by any theory the applicant believes that in one embodiment of the invention the reaction proceeds as follows, using DAB as the diamine ($A_2$) and either DEM or DEF as the ethylenically unsaturated diester ($B_3$). The reagents DAB and DEF or DEM are used for convenience to illustrate the invention, as they have simple structures, making it easier to draw structures for some of the component compounds of the resultant polycondensate polymer of the invention (which of course is a mixture of many different compounds). The selection of DAB and DEF or DEM below should not be considered limiting the scope of the invention.

One primary amine group of a first molecule of DAB adds by Michael addition across the C=C double bond of the diethylbutendioate (e.g. DEM or DEF) to produce a secondary amine:

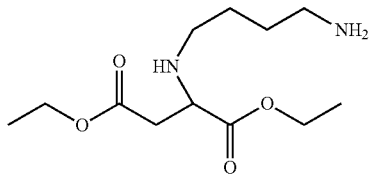 [SMILES: CCOC(=O)CC(NCCCCN)C(=O)OCC]

Reaction Product 1 (=RP1="$A_2B_3$")

The first reacting primary amine group on the unreacted diamine has a higher pKa than the second primary amine group e.g. when part of RP1. So for example when the diamine is DAB the first pKa is 11.75 (in water) the second pKa is 10.8.

The applicant has also found that in the presence of water the diesters will mainly undergo rapid hydrolysis to a COOH group before reaction with the second amine functional group can occur. The carboxylic acid group cannot undergo amidation so instead a salt is formed with the diamine.

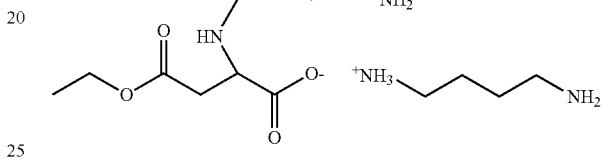

Reaction Product 2a (=RP2a ="$A_2B_3$")

In the absence of water (or other nucleophile) one primary amine group of a second molecule of DAB esterifies one of the ethoxy groups of the RP1 to produce (with 1 mole ethanol):

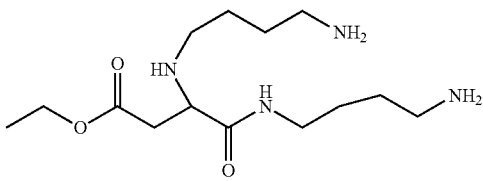 [SMILES: CCOC(=O)CC(NCCCCN)C(=O)NCCCCN]

Reaction Product 2b (=RP2b="$A_4B_3$") In the presence of water another carboxylate salt is formed with the cation formed from protanating further diamine and/or RP2a.

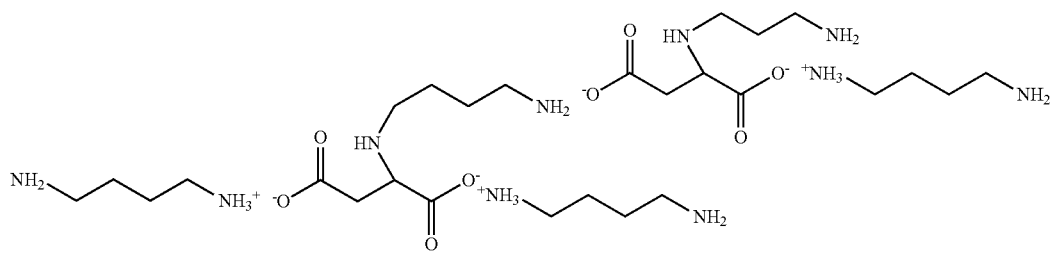

Reaction Product 3a (≡RP3a)

Again however in the absence of water one primary amine group of a third molecule of DAB transesterifies the [originally second]ethoxy group in RP2 to produce (with a further 1 mole ethanol):

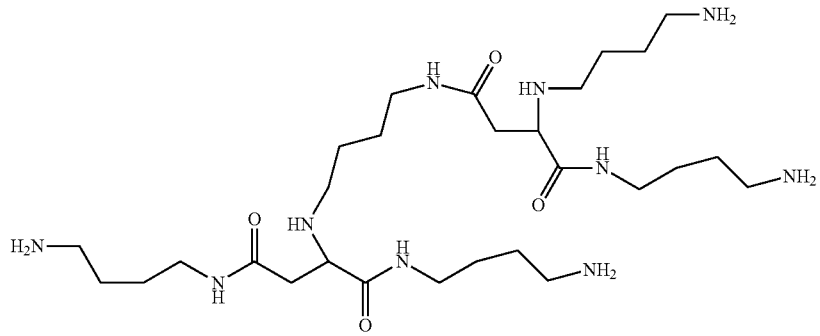 [SMILES: NCCCCNC(=O)CC(NCCCCNC(=O)CC(NCCCCN)C(=O)NCCCCN)C(=O)NCCCCN]

Reaction Product 3b (≡RP3b≡"$A_{10}B_6$")

The priminary amine functional groups on the reaction products can react in similar ways, i.e. in the presence of water the diamine adds to the C═C and the ester groups rapidly hydrolysis to carboxylic acid and ionic bonds may be formed via a salt to build up a larger moieties, whereas in the absence of sufficient water a covalent amide bond may be formed by amidation to grow the macromolecule.

Reaction Scheme

Reaction 1

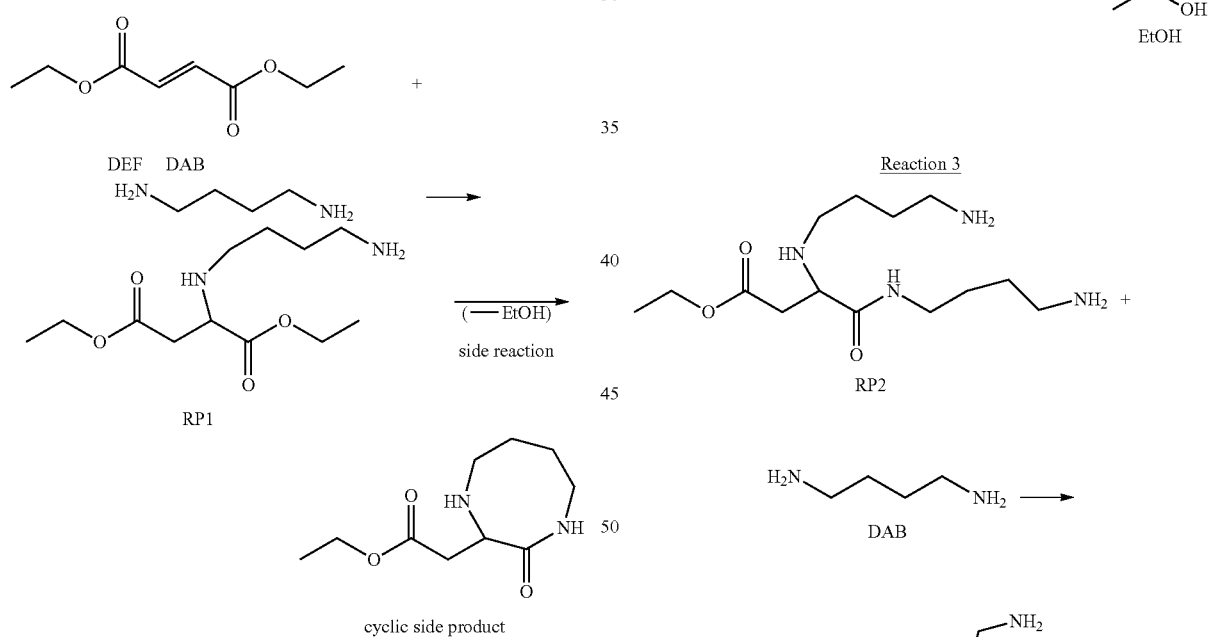

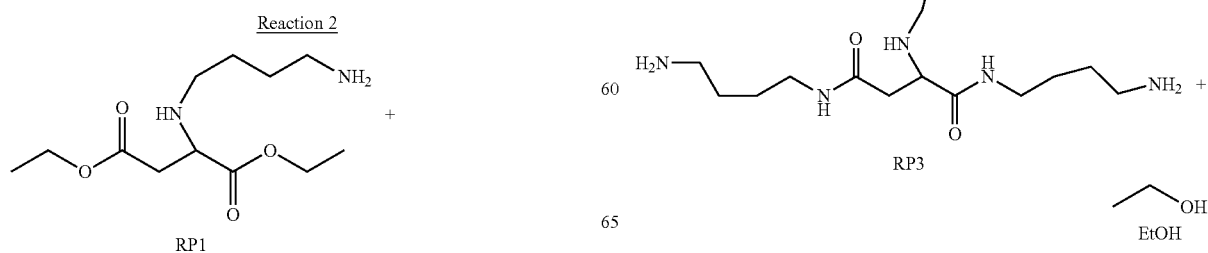

Overall

The overall the 3 step reaction scheme can be written:

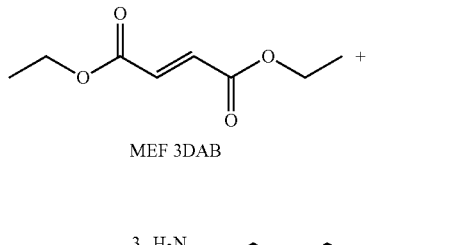

MEF 3DAB

3 H₂N‒‒‒NH₂ ⟶

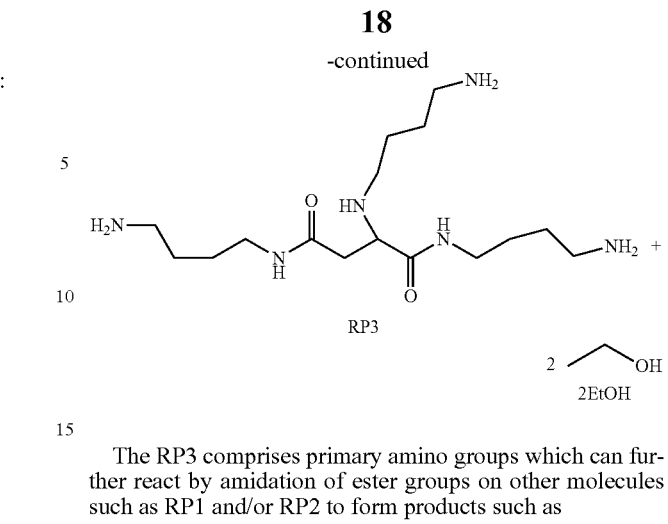

RP3

2 EtOH

The RP3 comprises primary amino groups which can further react by amidation of ester groups on other molecules such as RP1 and/or RP2 to form products such as

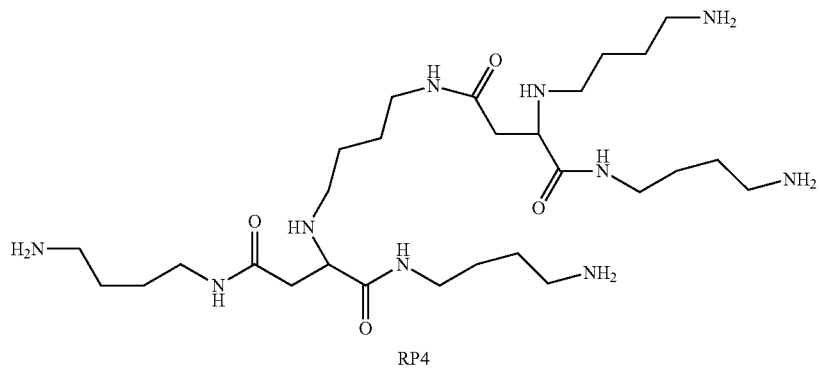 [SMILES: NCCCCNC(=O)CC(NCCCCNC(=O)CC(NCCCCN)C(=O)NCCCCN)C(=O)NCCCCN]

RP4

(from amidation of RP2 by RP3, i.e. where ethoxy group in RP2 is replaced by RP3 radical).

Broadly another aspect of the present invention provides a compound selected from the group (Group A) consisting of:

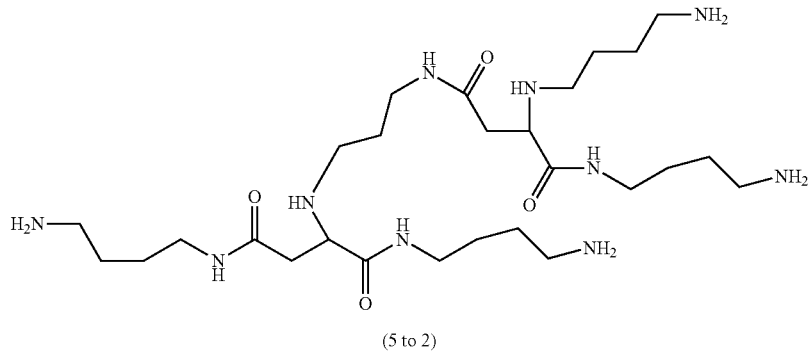

(5 to 2)

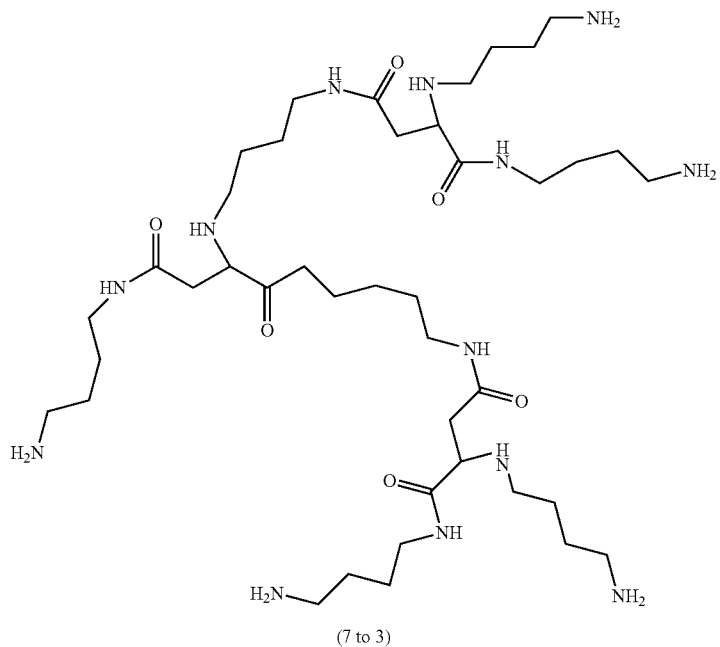
(7 to 3)
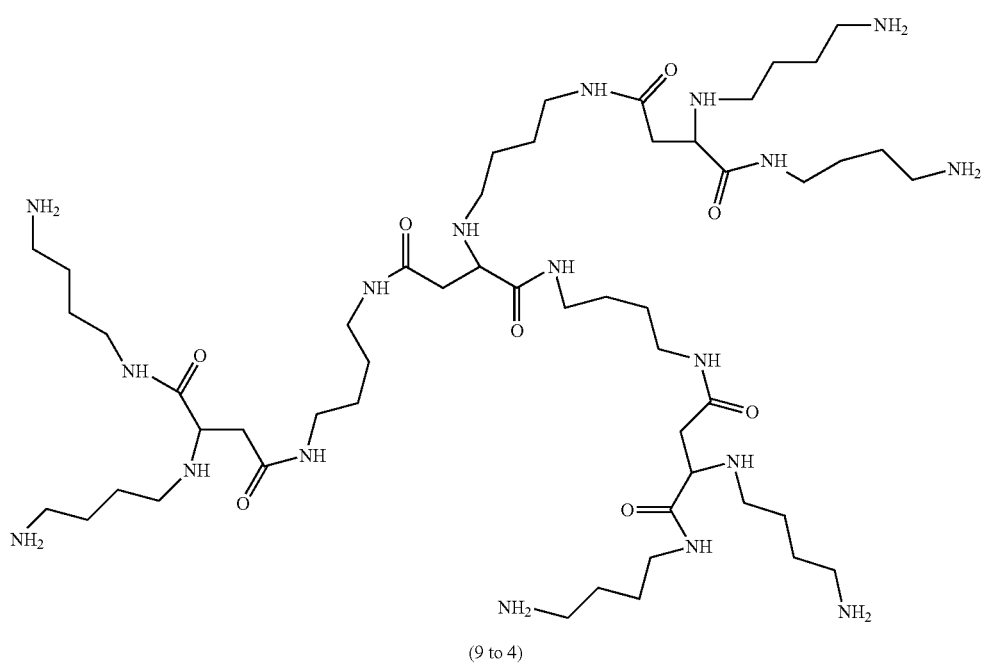
(9 to 4)

-continued

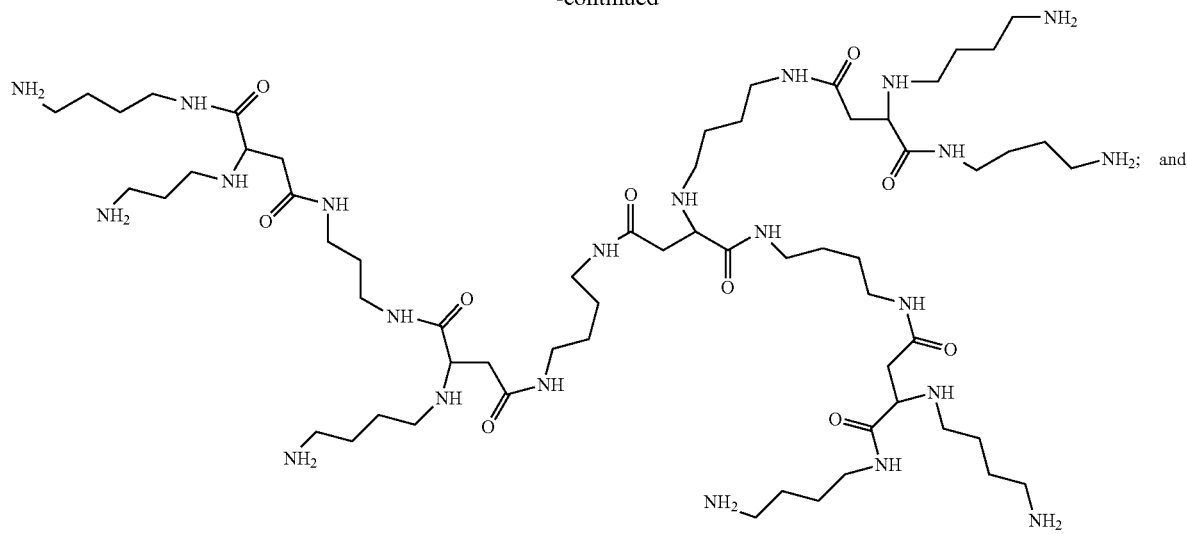

(11 to 15)

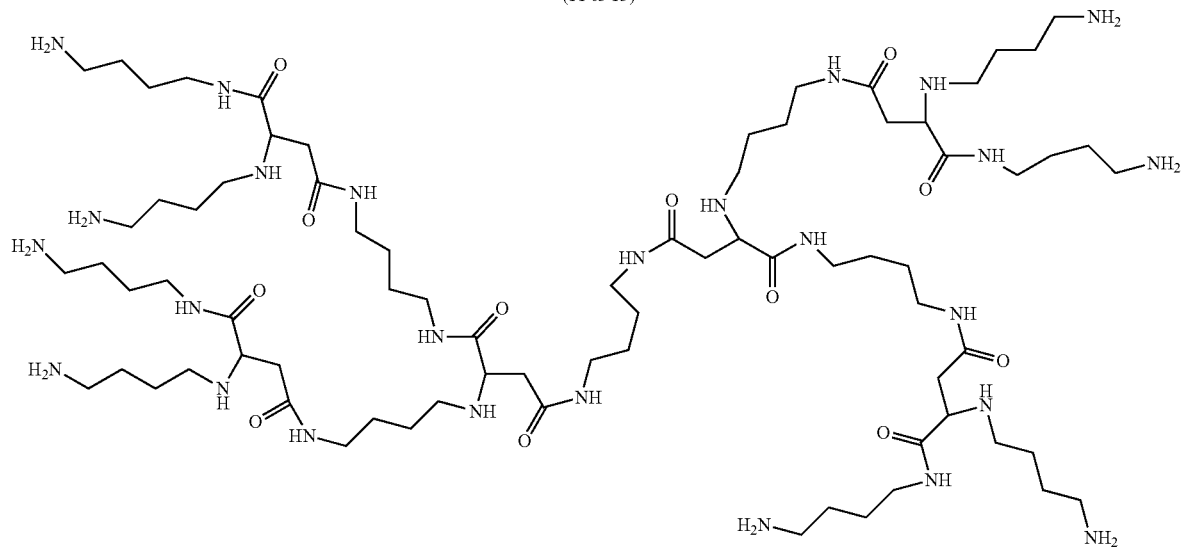

(13 to 6)

and optionally different forms thereof, such as geometric isomers, enantiomers and/or stereoisomers thereof.

It will be appreciated that analogous groups of structures could be drawn for other reaction products that are formed from reacting other unsaturated diesters with diamines such as any of those specifically described herein without the need to redraw them. Thus another embodiment of the invention provides a compound selected from the group (Group B) where group B denotes those compounds whose structures are represented by structures where the DAB derived moieties in Group A are replaced by the analogous HMDA derived moieties all else being unchanged. Similarly yet another embodiment of the invention provides a compound selected from the group (Group C) where group C represents the group A structures where the DAB derived moieties in Group A are replaced by lysine (or carboxylate salts, especially sodium salts, or esters thereof) derived moieties all else being unchanged.

Broadly yet another aspect of the present invention provides a polydisperse polymeric composition comprising at least one compound selected from the Group A, B and/or C (above), and preferably the at least one compound of Group A, B and/or C is present in the composition in a non trace amount, usefully in an amount of at least 1%, more usefully at least 5%, most usefully at least 10%, in particular at least 20% by weight of the total polymer composition.

Conveniently the at least one compound selected from Group A, B or C is obtained by a polycondensation process (for example the process of the invention as described herein).

Usefully the compositions of the invention do not form a gel after their initial formation. A gel is defined as a substantially dilute crosslinked system, which exhibits no flow when in the steady-state.

More usefully compositions of the present invention do not gel even after storage under standard conditions after 5 days, preferably after 10 days, more preferably after 20 days, most preferably after 25 days.

Conveniently compositions of the invention have a viscosity of less than 2500 mPas, more preferably less than 1700 mPas, most preferably less than 700 mPas.

Without wishing to be bound by any theory a possible reaction mechanism of a preferred embodiment of the process of the invention is that the reaction may occur in two parts a Michael addition of one amine group to the double bond of the unsaturated ester followed by an amidation where an alkyl ester is converted to an amide. It is believed that the Michael addition takes place before amidation because it is a more exothermic reaction.

In a still yet another aspect of the present invention provides a process for the preparation of a multi primary amine functional polymer prepared by adding a) an unsaturated dialkyl ester building block to b) a primary diamine containing building block; where the molar ratio of unsaturated dialkyl ester building block (a) to the primary diamine building block (b) is between 1 to 2.01 and 1 to 2.95; and the process is performed so no phase separation occurs.

For any process of the present invention one or more of the following conditions are preferred, more preferably all of them:
i) the molar ratio of unsaturated dialkyl ester to diamine is between 2.1 and 2.5.
ii) the process is performed at a temperature between 20° C. and the boiling point of the diamine (usefully between 20° C. and 100° C., more usefully between 20° C. and 80° C.).
iii) the process is performed at a pressure lower that atmospheric pressure.
iv) the unsaturated dialkyl ester is selected from the group consisting of: dialkyl maleate, dialkyl fumarate, dialkyl itaconate, dialkyl citraconate and dialkyl mesoconate.

A further aspect of the invention provides a polymer obtained and/or obtainable from any process of the invention as described herein, optionally said polymer having a plurality of primary amine functional groups thereon and further optionally also comprising secondary amine and/or amide functional groups.

Conveniently a polymer of the invention (the polymer comprising for example a polydisperse mixture of macromolecules with polydispersity of at least 1.5) comprises (more conveniently substantially comprises) at least one structure selected from the group consisting of Group A, B and C above.

Optionally a polymer of the invention has one or more of the following properties: i) a number molecular weight of at least 500 g/mole; ii) a primary amine content of at least 4, preferably at least 6 moles, more preferably at least 8 moles, —$NH_2$ groups per macromolecule; iii) a secondary amine content of at least 4 moles preferably at least 6 moles, more preferably at least 8 moles —NHR groups per macromolecule; iv) a total primary amine plus secondary amine content of at least 8 moles preferably at least 12 moles, more preferably at least 16 moles per macromolecule; v) an amide content of at least 4 moles, preferably at least 6 moles, more preferably at least 8 moles of —NHC=O— groups per macromolecule; and/or vi) is soluble (preferably completely soluble) in water.

The amine or amide content is calculated above as an average (mean) number of moles of the amine or amide group per macromolecule averaged over the whole polymer (where a polydisperse mixture of macromolecules).

There was a strong technical prejudice that this reaction scheme could not produce a useable product as it would form gel due to expected side reactions and intermolecular amidation of molecular intermediates that are ester functional (such as RP1, RP2 and analogues thereof).

Without wishing to be bound by any mechanism the applicant believes that as seen in the scheme above the process of the invention may produces monomer denoted as "$A_2B_3$" monomers (e.g. $A_2$ is the diamine such diamine butane (DAB) and $B_3$ is the unsaturated diester such a maleate diester). For example DAB (an example of $A_2$) is a chain stopper as it is more reactive that the secondary amine on the '$A_2B_3$" product for esterification. It is believed that the secondary amine on the '$A_2B_3$" monomer is as reactive as DAB for Michael addition across the double bond. Where $A_2$ is less reactive than '$A_2B_3$" then other structures such as a "$A_2B_6$" type may be formed [e.g. $A(B_2)B-A-(B_2)B$] resulting in a mixture of components '$A_2B_3$" "$A_4B_6$, $B_6$ etc., i.e. a gel is formed. If $A_2B_3$ is an ester then intermolecular esterification can occurs as the free $HN_2$ groups react with the ester.

One embodiment of the invention, a primary amine functional hyperbranched polyamide, will now be described.

The Michael addition and the amidation of ester bonds at low temperature can be used to prepare an amine functional hyperbranched polyamide from diamines such as 1,4-diaminobutane (DAB) and diethylfumarate (DEF). The first reaction which takes place is the Michael addition to the unsaturation of DEF with DAB. This reaction is exothermic and heats the reaction mixture from room temperature to 55° C. The second reaction is the amidation of the ethylester groups on the DEF. This reaction is much slower but occurs at room temperature. As there is a reactivity difference between the first and the second amidation of DEF an "$A_2B_3$" type monomer can be produced. Molecular weight of the product is built up by further amidation and removal of ethanol at relatively low temperature (below 100° C.). Without wishing to be bound by any theory the applicant believes that low temperature prevents amidation between amides resulting in free DAB and therefore prevents gelation. The ratio of DAB/DEF determines final molecular weight and number of functional groups on the product.

Comparative Evidence

To create a hyperbranched polymer a diethanol amine is reacted (by Michael addition across the ethylenic double bond) to an acrylated molecule as the core. After branching the alcohol groups of the Michael adduct are acrylated to produce a highly functional hyperbranched acrylate.

For example a polyamide can be prepared from TMP(EO) 15TA and DEA (Comp A-1). A hyperbranched molecule is prepared by reacting this hyperbranched acrylate (Comp A-1) with 1,4-diaminobutane (DAB) via a Michael addition to form a comparative example (Comp A-2).

Surprisingly the applicant has found that the primary amine groups of free DAB are more reactive with ester groups of the acrylate than are the secondary amine groups in the adduct formed when DAB reacts with acrylate. Thus DAB (="$A_2$") is a chain stopper and no gelation occurs and an amine functional hyperbranched polymer is the end product.

If water diluted Comp A-1 is added to 67% DAB the Michael addition occurs immediately resulting in an exothermic reaction which heats the reaction mixture from 20° C. to 55° C. $^1$H-NMR shows that all the acrylate unsaturation disappears. Above 70% reaction gel particles appear in the mixture, the reactivity difference of free and reacted DAB is too small. After several hours the gel particles surprisingly disappear. Without wishing to be bound by any theory the applicant believes that this is caused by amidation at room temperature of the ester bonds with the free primary amine groups. IR spectra show a complete disappearance of the ester bonds and a large increase in the amount of the amide.

This shows that (probably due to intermolecular amidation of esters) known highly branched structures (such as the hyperbranched polyester amides available commercially from DSM under the trade mark Hybrane® or the ester functional macromolecules available commercially from Perstorp under the trade nark Boltorn®) cannot be used to obtain highly branched macromolecules with primary and/or secondary amine groups thereon.

The term "comprising" as used herein means that the list that immediately follows is non exhaustive and may or may not include any other additional suitable items, for example one or more further feature(s), component(s), ingredient(s) and/or substituent(s) as appropriate. The terms 'substantially free of' and 'substantially comprising' as used herein means the following component or list of component(s) is respectively free (i.e. absent) or present in a given material to an extent or in an amount greater than or equal to about 90%, preferably 95%, more preferably 98% by weight of the total amount of the given material. The term "consisting of" as used herein mean that the list that follows is exhaustive and does not include additional items.

For all upper and lower boundaries of any parameters given herein, the boundary value is included in each range for each parameter. All combinations of minimum and maximum values of the parameters described herein may be used to define the parameter ranges for various embodiments and preferences of the invention.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

For example the percentages described herein (whether as mole % or weight %) for the composition, polymer (s) and parts thereof (e.g. monomer(s)) relate to the percentage of the total amount of certain specified components (e.g. monomer(s)) from which the relevant polymer or part thereof is obtained and/or obtainable. In one (preferred) embodiment of the invention the components specified sum 100% (e.g. no other monomers or units derived therefrom, comprise the relevant composition, polymer or part thereof). However it will be appreciated that in another embodiment of the invention other components (e.g. monomers or units derived therefrom) in addition to those specified above may also comprises the relevant composition, polymer or part thereof so the components explicitly described herein would then add up to less than 100% of the relevant composition, polymer or part therein.

Unless the context clearly indicates otherwise, as used herein plural forms of the terms herein (for example composition, monomer and/or polymer) are to be construed as including the singular form and vice versa.

The terms 'optional substituent' and/or 'optionally substituted' as used herein (unless followed by a list of other substituents or the context clearly indicates otherwise) signifies the one or more of following groups (or substitution by these groups): carboxy, sulfo, sulfonyl, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulfonyl if directly attached to each other represent a sulfamoyl group). Preferred optional substituents comprise: carboxy, sulfo, hydroxy, amino, mercapto, cyano, methyl, halo, trihalomethyl and/or methoxy, more preferred being methyl, hydroxy and cyano.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene).

Hydrocarbylyne groups comprise triivalent groups formed by removing three hydrogen atoms from a hydrocarbon, the free valencies of which are not engaged in a triple bond (for example alkylyne). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "$R_2C\equiv$"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Unless the context clearly indicates otherwise it will be appreciated that certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, π-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or tri-valent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

The terms 'effective', 'acceptable' 'active' and/or 'suitable' (for example with reference to any process, use, method, application, preparation, product, material, formulation, compound, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

One utility of the present invention comprises use of the amino functional polymers of the invention as a cross-linker for materials (such as other polymers) that will react with the amino groups.

A still yet further aspect of the present invention provides for a method of reacting a polymer of the invention by mixing with a second polymer comprising groups thereon which react with amino groups, and reacting the polymers together to form a cross-linked polymeric network.

A yet other aspect of the invention provides a polymeric network (such as a coating) obtained and/or obtainable by the method of the invention. Other aspects of the invention provide an article coated with a coating of the invention and use of a polymer of the invention as a cross-linker (optionally in the method of the invention).

As used herein, unless the context indicates otherwise, standard conditions (e.g. for drying a film) means a relative humidity of 50%±5%, ambient temperature (23° C.±2° and an air flow of less than or equal to (≤)0.1 m/s. 'Ambient temperature' (also referred to herein as room temperature) denotes 23° C.±2°. Many other variations embodiments of the invention will be apparent to those skilled in the art and such variations are contemplated within the broad scope of the present invention.

Further aspects of the invention and preferred features thereof are given in the claims herein if not already described herein.

FIGURES

The invention is illustrated by the following non-limiting figures where:

EXAMPLES

The present invention will now be described in detail with reference to the following non limiting examples which are by way of illustration only.

Example 1

To 328.5 g 67% DAB solution in water (2.5 mol) is 171.89 g DEF (1 mol) dosed in 30 minutes. During the addition the temperature of the reaction mixture rises from 23° C. to 51° C.

This mixture is analyzed with H-NMR and IR. After stirring for 1.5 hours the water and formed ethanol is being removed on a rotavap ant 81° C. and 20 mbar vacuum. During this step more ethanol is formed and removed. The final reaction product is analyzed: $^1$H-NMR, IR, amine titration and viscosity.
Results Three different ratio's resulting in higher molecular weights was synthesized. An overview of the analytical results is given in the table below:

| Ex | Mol ratio DEF/DAB | $[NH_2-NH]$ mmol/g | Theor. $[NH_2-NH]$ mmol/g | Theor. Mn | Viscosity (Pas at 50° C.) | Conversion H-NMR * | Mol ratio $NH_2/NH$ | % free EtOH (H-NMR) |
|---|---|---|---|---|---|---|---|---|
| 1 | 2/5 | 9.3 | 9.9 | 604 | 27.2 | 97.4 | 4/2 | 3.0 |
| 2 | 3/7 | 9.3 | 9.3 | 862 | 40.8 | 98.9 | 5/3 | 2.1 |
| 3 | 4/9 | 9.1 | 8.9 | 1120 | n.m | 95.1 | 6/4 | 3.1 |

* based on amidation of ester bonds, Michael addition has reacted 100%.

Figure 1:
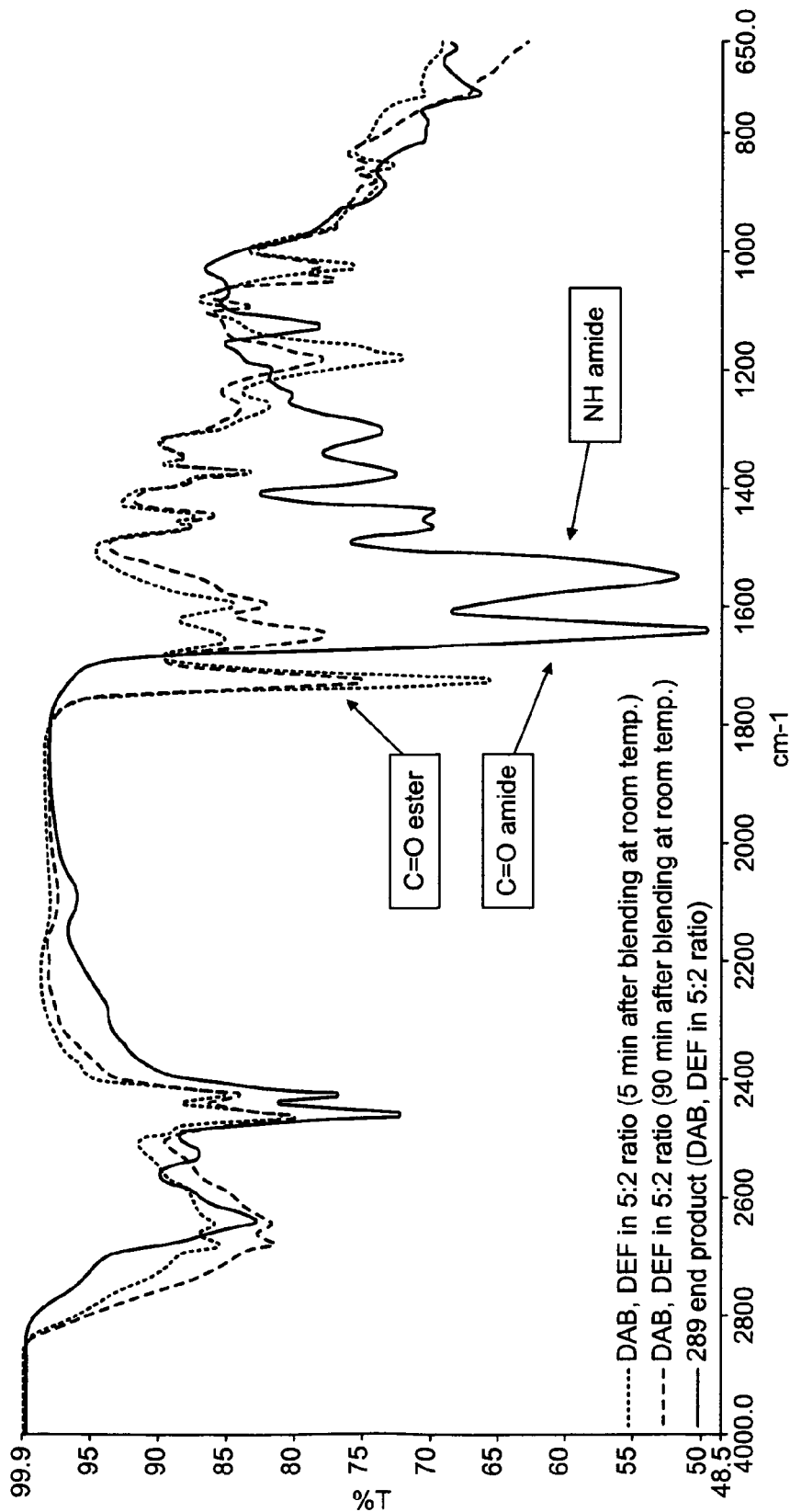
FIG. 1 shows an IR (infrared) spectrum of the examples is prepared herein

IR Spectrum is Shown in FIG. 1 Herein

The infrared spectrum shows a rapid decrease of the ester bound and increase of amide related absorptions even at room temperature. In the final product the ester bounds disappear completely.

Figure 2:
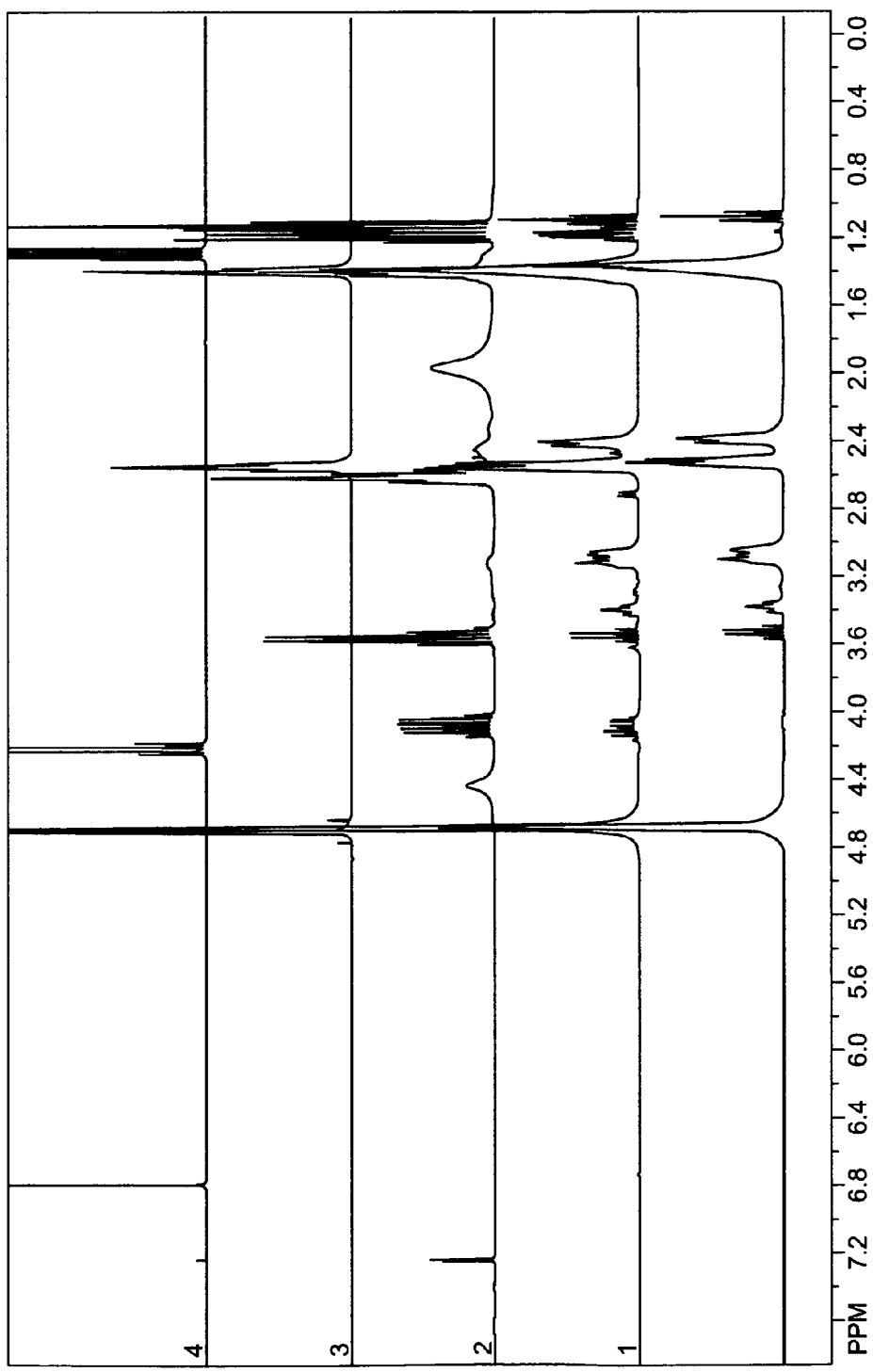
FIG. 2 shows a proton NMR of the examples is prepared herein

$^1$H-NMR is Shown in FIG. 2 Herein

$^1$H-NMR show that the Michael addition of DAB to the unsaturation of DEF occurs fast, if all DEF is added to DAB no unsaturations can be detected with H-NMR. Also the formation of amide and the decrease of ester are observed. The relation to the $CH_2$ Beta to the amine/amide (at 1.4 ppm) and the $CH_2$ next to the ester (at 4.1 ppm) can be used to determine the conversion of the ester into an amide.

Furthermore the amount of free ethanol can be calculated using the $CH_2$ beta to the amine/amide (at 1.4 ppm) and the $CH_3$ (at 1.1 ppm) of the ethanol.

Some protons are slightly different but have the same number (for example nr 4, 5, 9, 12 and 13). In FIG. 2 these differences are not visible.

The results show that little or no cyclic products are formed.

In H-NMR the ratio of $CH_2$ beta to the amine/amide (at 1.4 ppm) versus $CH_2$ alpha to the primary amine should be 20 to 8. Formation of cyclic would lower the ratio of $CH_2$ alpha to the primary amine. Is this case the ratio is 20 to 8.5 which means the formation of cyclic does not occur in significant amounts if the free DAB concentration is low.

Comparison

A known hyperbranched polyester amide (that available from DSM under the trade mark Hybrane® S1200) is blended with DAB. It is observed with IR that within 90 minutes at room temperature the ester vibrations decrease by more than half and after 1 day the ester vibration are completely gone. The viscosity of the product is decreased and GPC measurements show complete breakdown of the hyperbranched polymer (S1200).

Diamines and unsaturated diester in the specific ratios described herein would normally result in completely cross linked structures, i.e. gel formation, according to the theory of Flory. The theoretical conversion at gel point are given in the table below.

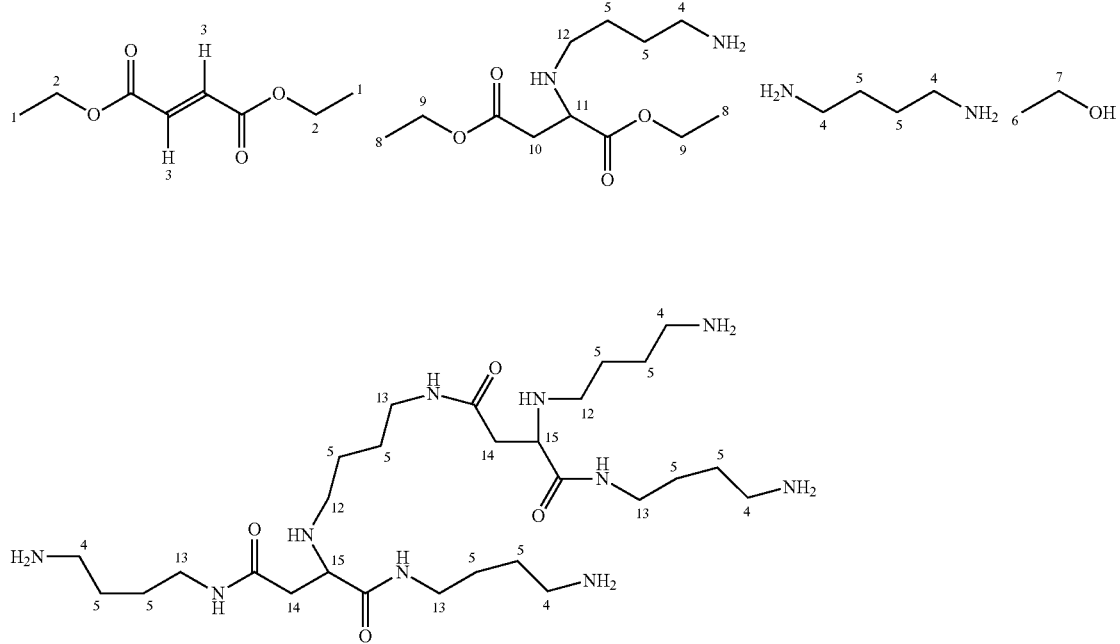

| Mol ratio DEF/DAB | Theor. Conversion at gel point (%) | Actual conversion (%) * |
|---|---|---|
| 2/5 | 91.3 | 98.3 |
| 3/7 | 88.2 | 99.4 |
| 4/9 | 86.6 | 96.5 |

* Sum of Michael addition and amidation

In a conventional "$A_2B_3$" system approximately 35% of excess of one of the two components is needed to prevent gelation. This means that in instead of 9 mol DAB used herein it would be expected to use over 12 mol DAB in a conventional system to prevent gelation.

Further examples were prepared using the standard method described below, in combination with the tables.

Further examples are prepared using the standard method described below, in combination with the tables.

Monomers Used in Examples

Diamines 1,4-diaminobutane (DAB)

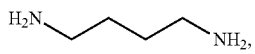

1,6-diaminohexane (HMDA).

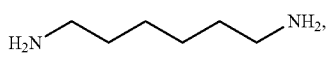

or 1, 5-2-methylpentanediamine≡2-methylpentamethylenediamine (MPMD), available commercially from Invista under the trade mark Dytek® A;

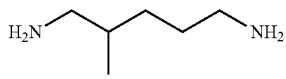

Unsaturated Diesters diethyl fumarate (DEF)

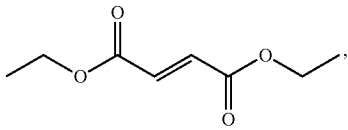

diethyl maleate (DEM)

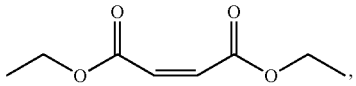

dimethyl itaconate (DMI).

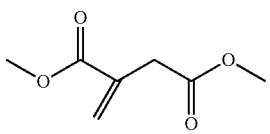

Standard Method (Weights Rounded to Nearest Gram)

Part 1—To 'a' grams of diamine A in a reaction vessel was added 'b' grams of unsaturated diester B over 'c' minutes. The proportion of diamine to unsaturated diester was R. An exothermic reaction resulted heating the mixture to 'd' ° C. A sample was taken and analysed with FTIR, H-NMR and viscosity was measured. The reaction vessel was then heated to 80° C. in an oil bath to raise the temperature of the reaction mixture to 'e'° C. and this temperature was maintained until FTIR and H-NMR analysis of samples taken during the reaction showed that all the ester groups had reacted.

Part 2—The oil bath was kept at 80° C. and the pressure of the reaction vessel was reduced to 'f' mbar, the maximum pressure at which (given its boiling point) the free diamine monomer remained in the reaction mixture. The reduced pressure was maintained until all ethanol and as much water as possible had been removed from the reaction mixture. A final product was obtained which was characterised using Fourier Transform Infrared Spectroscopy (FTIR), NMR (proton and/or $^{13}C$), viscosity measurements, amine titration and/or liquid chromatography—mass spectrometry (LC-MS).

Synthesis of $A_2B_3$ 5/2 Resins (Ex 4 to 6)

| Ex | Diamine | 'a' g | Ester | 'b' g | 'c' mins | R | 'd' ° C. | 'e' ° C. | 'f' mbar |
|---|---|---|---|---|---|---|---|---|---|
| 4 | 67.3% aq DAB | 207 | 98% aq DEF | 110 | 30 | 5/2 | 48.3 | 74.2 | 150 |
| 5 | 67.3% aq HMDA | 272 | 98% aq DEF | 110 | 30 | 5/2 | 48.3 | 74.2 | 50 |
| 6 | 67.3% aq MPMD | 272 | 98% aq DEF | 110 | 30 | 5/2 | 48.3 | 74.2 | 70 |
| 7 | 67.3% aq DAB | 207 | 98% aq DEM | 110 | 30 | 5/2 | 48.3 | 74.2 | 150 |
| 8 | 67.3% aq HMDA | 272 | 98% aq DEM | 110 | 30 | 5/2 | 48.3 | 74.2 | 50 |
| 9 | 67.3% aq MPMD | 272 | 98% aq DEM | 110 | 30 | 5/2 | 48.3 | 74.2 | 70 |

Synthesis of $A_2B_3$ 9/4 Resins (Ex 7 to 9

| Ex | Diamine | 'a' g | Ester | 'b' g | 'c' mins | R | 'd' ° C. | 'e' ° C. | 'f' mbar |
|---|---|---|---|---|---|---|---|---|---|
| 10 | 67.3% aq DAB | 158 | 98% aq DEF | 95 | 30 | 9/4 | 51.1 | 72.6 | 150 |
| 11 | 67.3% aq HMDA | 208 | 98% aq DEF | 95 | 30 | 9/4 | 51.1 | 72.6 | 50 |
| 12 | 67.3% aq MPMD | 208 | 98% aq DEF | 95 | 30 | 9/4 | 51.1 | 72.6 | 70 |
| 13 | 67.3% aq DAB | 158 | 98% aq DEM | 95 | 30 | 9/4 | 51.1 | 72.6 | 150 |
| 14 | 67.3% aq HMDA | 208 | 98% aq DEM | 95 | 30 | 9/4 | 51.1 | 72.6 | 50 |
| 15 | 67.3% aq MPMD | 208 | 98% aq DEM | 95 | 30 | 9/4 | 51.1 | 72.6 | 70 |

Synthesis of $A_2B_3$ 9/4 Resins in Ethanol (Comparative—Comp A to C)

All diamines supplied in 99.9% EtOH, after esters had reacted (end of part 1) each of Comps A to C turned into gel overnight

| Ex | Diamine | 'a' g | Ester | 'b' g | 'c' mins | R | 'd' °C. | 'e' °C. | 'f' mbar |
|---|---|---|---|---|---|---|---|---|---|
| A | 67.98% DAB | 199 | 98% aq DEF | 119 | 30 | 9/4 | 46.3 | 72.6 | 150 |
| B | HMDA | 176 | 98% aq DEF | 119 | 30 | 9/4 | 46.3 | 72.6 | 50 |
| C | MPMD | 176 | 98% aq DEF | 119 | 30 | 9/4 | 46.3 | 72.6 | 70 |

Synthesis of HMDA/DEF 9/4 Resins in Various Water Concentrations (Ex 10 & 8 and Comp D & E)

HDMA was added in 67.62% of solvent (where the solvent was a mixture of water and 99.9% ethanol) and where the water CD amount h % was calculated based on the total mass of base including the DEF. After one day not all esters were converted into amines (end part 1) so the mixture was heated for a further day. Comp D and E turned into a gel at the end of part 1 before reduced pressure could be applied.

| Ex | Diamine | 'h' % | 'a' g | Ester | 'b' g | 'c' mins | R | 'd' °C. | 'e' °C. | 'f' mbar |
|---|---|---|---|---|---|---|---|---|---|---|
| 16 | 67.62% HMDA | 10.10 | 227 | 98% aq DEF | 101 | 30 | 9/4 | 43.5 | 71.4 | 50 |
| 11 | 67.62% HMDA | 22.10 | 227 | 98% aq DEF | 101 | 30 | 9/4 | 43.5 | 71.4 | 50 |
| D | 67.62% HMDA | 5.02 | 227 | 98% aq DEF | 101 | 30 | 9/4 | 43.5 | 71.4 | 50 |
| E | 67.62% HMDA | 0.00 | 227 | 98% aq DEF | 101 | 30 | 9/4 | 43.5 | 71.4 | 50 |

Synthesis of HMDA/DEF or DEM 9/4 Resins in Various Solvents (Ex 8 and Comp F & B)

In Comp F the HMDA did not readily dissolve in DMSO so the mixture was heated to melted the HMDA and improve mixing. The DEM was added dropwise. After part 1 the reaction mixture was allowed to stand for three days at room temperature and then reheated using an oil bath at 80° C., left overnight at room temperature and one day later the mixture was a gel.

| Ex | Diamine | solvent | 'a' g | Ester | 'b' g | 'c' mins | R | 'd' °C. | 'e' °C. | 'f' mbar |
|---|---|---|---|---|---|---|---|---|---|---|
| 11 | HMDA | 22.10% water | 227 | 98% aq DEF | 101 | 30 | 9/4 | 43.5 | 71.4 | 50 |
| F | HMDA | DMSO | 225 | 98% aq DEM | 100 | 25 | 9/4 | 43.5 | 66.5 to 76.5 | 50 |
| B | HMDA | EtOH | 225 | 98% aq DEF | 118 | 30 | 9/4 | 46.3 | 72.6 | 50 |

Synthesis of HMDA/DEM 9/4 Resin with Water Free Michael Addition (Comp G)

| Ex | Diamine | 'a' g | Ester | 'b' g | R | 'd' °C. | 'e' °C. | 'f' mbar |
|---|---|---|---|---|---|---|---|---|
| G | 98% HMDA | 151 | 98% DEM | 100 | 9/4 | 45.8 to 80.9 | 71.4 | 50 |

In Comp G the HMDA (boiling point 38-41° C.) was first melted in an oven and the reaction vessel just sufficiently to keep the HDMA liquid. The pressure in the vessel was reduced to 100 mbar and the mixture was heated to 80° C. to remove any water that might be present in the HDMA (though no visible distillation was observed). The pressure was increased to atmospheric and the DEM added to mixture dropwise. After the exothermic reaction the mixture rapidly cooled and samples were taken and analysed with FTIR, H-NMR and back titration with HCl and KOH.

After 90 minutes 75.6 g water was added (=23% w/w on total mass). One hour later a sample was taken and the mixture heated with the oil bath (80° C.). After three hours a third sample was taken and the oil bath was switched off. The product continued reaction during the night at room temperature and the next day a fourth sample was taken. Then the oil bath was turned on again and after 90 minutes another sample is taken. After this sample, the pressure of the vessel was reduced to 50 mbar to remove all water and ethanol. One and a half hour later H-NMR confirmed there was no ethanol left in the product and the reaction had finished to produce a product characterised as described herein.

Example 17

Di ethyl maleate (687.2 g) was added to a reaction vessel followed by 2625.6 grams of 50% Lysine solution in water.

The mixture was stirred to produce a brownish black emulsion. Over 30 minutes 718.4 grams of 50% NaOH solution was added and the reactor temperature was held at 50° C. for 4 hours whilst the exothermic reaction was allowed to proceed. The reactor was then heating at 90° C. under reflux for a further 1.5 hours until infra red analysis detected no residual ester groups in the reaction mixture. The reactor was cooled to 50° C. and the pressure was reduced to 200 mbar for 2 hours, The reactor temperature was then increased to 55° C. and the pressure decreased to 150 mbar for 30 minutes after which the temperature was further increased to 60° C. and pressure reduced to 100 mbar for one hour to obtain a product characterised as follows:

Solids: 70%, Viscosity 3 Pas (at 23° C.). Total amount of distillate (ethanol/water) 650 grams

The invention claimed is:
1. A process for preparing a substantially gel free non-dendrimer polyamide comprising primary amino groups, the process comprising the step of reacting Reagent A and Reagent B in a reaction mixture in the presence of at least 5.1% and less than 23.3% water by weight of a total amount of Reagents A and B sufficient to prevent gelation, wherein
  Reagent A comprises at least one diamino$C_{1-12}$hydrocarbon; and
  Reagent B comprises at least one di($C_{1-12}$hydrocarbo-oxy)$C_{3-10}$hydrocarbo-enedioate and/or anhydride thereof, wherein
  Reagent A and Reagent B are present in an amount to provide a molar ratio Rt of Reagent A to Reagent B which is in a range of 1.1 to 2.9.
2. The process as claimed in claim 1, wherein
  Reagent A comprises a diamino$C_{1-10}$alkane; and
  Reagent B comprises a di($C_{1-6}$alkoxy)$C_{4-6}$alkenedioate ester; and wherein
  Rt is in the range from 2.0. to 2.8; and wherein
  the reaction is carried out in the presence of from 6% to 20% water by weight of the total amount of Reagents A and B.
3. The process as claimed in claim 1, wherein Rt is in the range from 2.1. to 2.7.
4. The process as claimed in claim 1, wherein the process is carried out in the presence of an amount of water which is from 7% to 15% by weight of the total amount of Reagents A and B.
5. The process as claimed in claim 1, wherein the process is performed at a pressure lower than atmospheric pressure and greater than 30 mbar.
6. The process as claimed in claim 1, wherein the process is performed a temperature between 0° C. and a boiling point of the Reagent A.
7. The process as claimed min claim 1, wherein the Reagent A is selected from the group consisting of 1,4-diaminobutane (DAB), 1,5-diamino-2-methylpentane (M PM D), 1,5-pentanediamine hexamethylene-diamine (HMDA), 1,5-diamino-2-carboxypentane, lysine esters and lysine salts.
8. The process as claimed min claim 1, wherein the Reagent B is selected from the group consisting of dialkyl maleate, dialkyl fumarate, dialkyl itaconate, dialkyl citraconate, dialkyl mesaconate and mixtures thereof.
9. The process as claimed in claim 1, wherein the process his performed until the reaction mixture satisfies at least one condition of:
  (i) being substantially free of ethylenic double bonds as measured by proton NMR; and
  (ii) comprising no more than 5% equivalents of an initial amount of Reagent B of ester double bonds as measured by proton NMR.
10. A non-dendrimer polymer comprising amino groups, obtained by the process as claimed in claim 1.
11. The non-dendrimer polymer as claimed in claim 10, wherein the polymer comprises or more amino functional polyamide molecules represented by Formula 1:

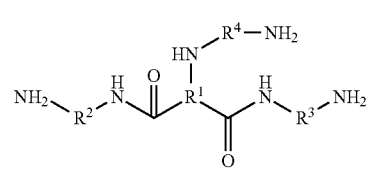

Formula 1 in which:
  $R^1$ is independently in each case a $C_{2-6}$hydrocarbylyne; and
  $R^2$, $R^3$ and $R^4$ independently in each case and of each other represent a moiety selected from the group consisting of:
    $C_{2-6}$ hydrocarbylene and a divalent or trivalent linking moiety of Formula 2:

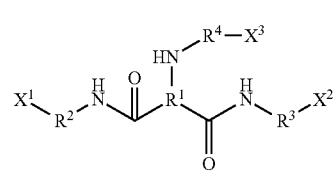

Formula 2 in which
  $R^1$, $R^2$, $R^3$ and $R^4$ are independently in each case and of each other are defined as above; and
  $X^1$, $X^2$ and $X^3$ independently in each case and of each other represent at least one of the following options:
  (i) an amino group;
  (ii) a direct single bond between an atom of the moiety of Formula 2 and an atom of the molecule of Formula 1 or of a further moiety of Formula 2; and
  (iii) a divalent imino group (-NH-) attached to a molecule of Formula 1 or a further moiety of Formula 2; wherein
  at least two of $X^1$, $X^2$ and $X^3$ represent a bond according to option (i) or an imino group according to option (ii);
  with the proviso that where any of $X^1$, $X^2$ or $X^3$ denote the imino group according to option (ii) then $X^1$, $X^2$ or $X^3$ are not directly attached to another nitrogen atom in the molecule of Formula 1 or the moiety of Formula 2.
12. The non-dendrimer polymer as claimed in claim 11, wherein $R^1$ independently in each case is $C_{2-6}$alkylyne, and wherein $R^2$, $R^3$ and $R^4$ independently in each case and of each other represent $C_{2-6}$alkylene.
13. The non-dendrimer polymer as claimed in claim 12, wherein $R^1$ independently in each case is ethylyne, and wherein $R^2$, $R^3$ and $R^4$ independently in each case and of each other represent ethylene.
14. The non-dendrimer polymer as claimed in claim 10, wherein the polymer has a polydispersity of at least 1.5.
15. The non-dendrimer polymer as claimed in claim 10, wherein the polymer has a number average molecular weight (Mn) of at least 500 daltons.

16. The non-dendrimer polymer in claim 10, wherein the polymer has on average at least four amine groups per polymer macromolecule.

17. A method comprising a step of reacting the non-dendrimer polymer as claimed in claim 10 with a second polymer comprising groups thereon which react with amino groups to form a polymeric reaction product.

18. A coating comprising the non-dendrimer polymer as claimed in claim 10.

19. An article coated with the coating as claimed in claim 18.

* * * * *